United States Patent
Byrne

(10) Patent No.: US 11,616,685 B2
(45) Date of Patent: Mar. 28, 2023

(54) DATA LINK ERROR FEEDBACK SIGNALING

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 17/687,793

(22) Filed: Mar. 7, 2022

(65) Prior Publication Data

US 2022/0191086 A1    Jun. 16, 2022

Related U.S. Application Data

(63) Continuation of application No. 16/896,290, filed on Jun. 9, 2020, now Pat. No. 11,303,504.

(51) Int. Cl.
*H04L 41/0654* (2022.01)
*H04L 9/40* (2022.01)
(Continued)

(52) U.S. Cl.
CPC ........ *H04L 41/0654* (2013.01); *H04L 1/0061* (2013.01); *H04L 45/1283* (2013.01); *H04L 45/28* (2013.01); *H04L 63/126* (2013.01)

(58) Field of Classification Search
None
See application file for complete search history.

(56) References Cited

U.S. PATENT DOCUMENTS

| 6,539,427 B1 | 3/2003 | Natarajan et al. |
| 6,714,551 B1 | 3/2004 | Le-Ngoc |

(Continued)

FOREIGN PATENT DOCUMENTS

| CN | 106789709 | 5/2017 |
| KR | 1020100115133 | 3/2011 |

OTHER PUBLICATIONS

W. Fischer, Link Aggregation, pp. 1-3, as retrieved using the internet archive www.archive.org from https://www.admin-magazine.com/Articles/Increasing-Throughput-with-Link-Aggregation as archived on Jan. 25, 2013.*

(Continued)

*Primary Examiner* — Christopher M Crutchfield
(74) *Attorney, Agent, or Firm* — Brownstein Hyatt Farber Schreck, LLP

(57) ABSTRACT

A data link error feedback signaling system includes a transmitting network device and a receiving network device. The receiving network device may be operable to receive a network data unit from the transmitting network device over a data link, detect an error in the network data unit, and provide data link integrity information based on the error to the transmitting network device. The receiving network device may provide the data link integrity information by marking the data link flawed in a routing protocol, transmitting the data link integrity information via an informational protocol, and so on. The transmitting network device may respond to the data link integrity information, such as by marking the data link less preferred, marking the data link down, transmitting an alarm regarding the data link to a network operator, omitting taking an action upon determining that errors are below an error threshold, and so on.

20 Claims, 5 Drawing Sheets

(51) Int. Cl.
*H04L 1/00* (2006.01)
*H04L 45/128* (2022.01)
*H04L 45/28* (2022.01)

(56) References Cited

U.S. PATENT DOCUMENTS

| | | |
|---|---|---|
| 7,301,448 B1 | 11/2007 | Usery et al. |
| 9,143,236 B1 | 9/2015 | Bartur et al. |
| 9,755,956 B1 | 9/2017 | Song et al. |
| 10,218,467 B2 | 2/2019 | Sung et al. |
| 2004/0107382 A1 | 6/2004 | Doverspike |
| 2005/0036452 A1 | 2/2005 | Banerjee |
| 2005/0254431 A1 | 11/2005 | Sills |
| 2006/0150055 A1 | 7/2006 | Quinard et al. |
| 2006/0251106 A1* | 11/2006 | Nakagawa ............ H04L 47/41 370/456 |
| 2009/0067324 A1* | 3/2009 | Licardie ............ H04L 43/0811 370/225 |
| 2009/0154337 A1* | 6/2009 | Kim ............ H04L 69/323 370/216 |
| 2010/0188972 A1 | 7/2010 | Knapp et al. |
| 2010/0278225 A1 | 11/2010 | Chun et al. |
| 2011/0299410 A1 | 12/2011 | Diab et al. |
| 2012/0213305 A1 | 8/2012 | Oh et al. |
| 2016/0080254 A1 | 3/2016 | Zhou et al. |
| 2016/0277996 A1 | 9/2016 | Huang et al. |
| 2017/0126478 A1* | 5/2017 | Morris ............ H04L 41/0654 |
| 2017/0127453 A1 | 5/2017 | Adachi et al. |
| 2017/0230265 A1* | 8/2017 | Mishra ............ H04L 47/728 |
| 2018/0034665 A1 | 2/2018 | Nguyen et al. |
| 2020/0162368 A1 | 5/2020 | Xu et al. |
| 2020/0169918 A1 | 5/2020 | Hwang et al. |

OTHER PUBLICATIONS

Author Unknown, "Troubleshooting Physical Layer Alarms on SONET and SDH Links," pp. 1-8, 2014.
Bernstein et al., "Optical Network Control: Architecture, Protocols, and Standards," pp. 1-8, 2003.
Lindern et al., "BGP Logical Link Discovery Protocol (LLDP) Peer Discovery," pp. 1-18, Jun. 2020.

* cited by examiner

DATA LINK ERROR FEEDBACK SIGNALING

CROSS-REFERENCE TO RELATED APPLICATION(S)

This application is a continuation patent application of U.S. patent application Ser. No. 16/896,290, filed Jun. 9, 2020 and titled "Data Link Error Feedback Signaling," the disclosure of which is hereby incorporated herein by reference in its entirety.

FIELD

The described embodiments relate generally to networking. More particularly, the present embodiments relate to data link error feedback signaling.

BACKGROUND

As time goes on, the number of network devices continues to grow. Such network devices include smart phones, laptop computing devices, desktop computing devices, server computing devices, digital media players, smart doorbells, smart thermostats, routers, hubs, switches, wearable devices, mobile computing devices, tablet computing devices, smart kitchen appliances, smart laundry machines, and so on. The various networks that interconnect such devices also continue to grow, as well as the data traffic on such networks.

SUMMARY

The present disclosure relates to data link error feedback signaling. A data link error feedback signaling system includes a transmitting network device and a receiving network device. The receiving network device may be operable to receive a network data unit from the transmitting network device over a data link, detect an error in the network data unit, and provide data link integrity information based on the error to the transmitting network device. The receiving network device may provide the data link integrity information by marking the data link flawed in a routing protocol, transmitting the data link integrity information via an informational protocol, and so on. The transmitting network device may respond to the data link integrity information, such as by marking the data link less preferred, marking the data link down, transmitting an alarm regarding the data link to a network operator, omitting taking an action upon determining that errors are below an error threshold, and so on.

In various embodiments, a data link error feedback signaling system includes a transmitting network device and a receiving network device. The receiving network device is operable to receive a network data unit from the transmitting network device over a data link, detect an error in the network data unit, and provide data link integrity information based on the error to the transmitting network device. The transmitting network device responds to the data link integrity information.

In some examples, the receiving network device provides the data link integrity information by at least one of marking the data link flawed in a routing protocol or transmitting the data link integrity information via an informational protocol. In a number of examples, the transmitting network device responds to the data link integrity information by at least one of marking the data link less preferred, marking the data link down, transmitting an alarm regarding the data link to a network operator, or omitting taking an action upon determining that errors are below an error threshold. In various examples, the receiving network device detects the error using at least one of a cyclic redundancy check or a checksum. In a number of examples, at least one of the receiving network device or the transmitting network device is a router.

In some embodiments, a receiving network device includes a communication unit, a non-transitory storage medium that stores instructions, and a processor. The processor executes the instructions to receive a network data unit from a transmitting network device over a data link, detect an error in the network data unit, and provide data link integrity information based on the error to the transmitting network device.

In various examples, the processor determines that the data link is flawed based on the error. In some examples, the processor detects the error by performing a cyclic redundancy check on the network data unit. In a number of examples, the processor detects the error by evaluating a checksum of the network data unit.

In some examples, the processor provides the data link integrity information by marking the data link flawed in a routing protocol. In various implementations of such examples, the routing protocol is at least one of an open shortest path first protocol, a border gateway protocol, or a bidirectional forwarding detection protocol.

In a number of examples, the processor provides the data link integrity information via an informational protocol. In some implementations of such examples, the informational protocol is a link layer discovery protocol.

In various examples, the processor provides the data link integrity information as part of an aggregate of data corresponding to multiple network data unit errors.

In a number of embodiments, a transmitting network device includes a communication unit, a non-transitory storage medium that stores instructions, and a processor. The processor executes the instructions to transmit a network data unit to a receiving network device over a data link, receive data link integrity information from the receiving network device based on an error detected in the network data unit by the receiving network device, and respond to the data link integrity information.

In various examples, the processor responds to the data link integrity information by taking an action. In some implementations of such examples, the action includes marking the data link less preferred. In a number of implementations of such examples, the action includes marking the data link down.

In some examples, the processor responds to the data link integrity information by transmitting an alarm regarding the data link to a network operator. In various examples, the processor responds to the data link integrity information by, when an error threshold is exceeded, performing an action and, when the error threshold is not exceeded, omit performing the action.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
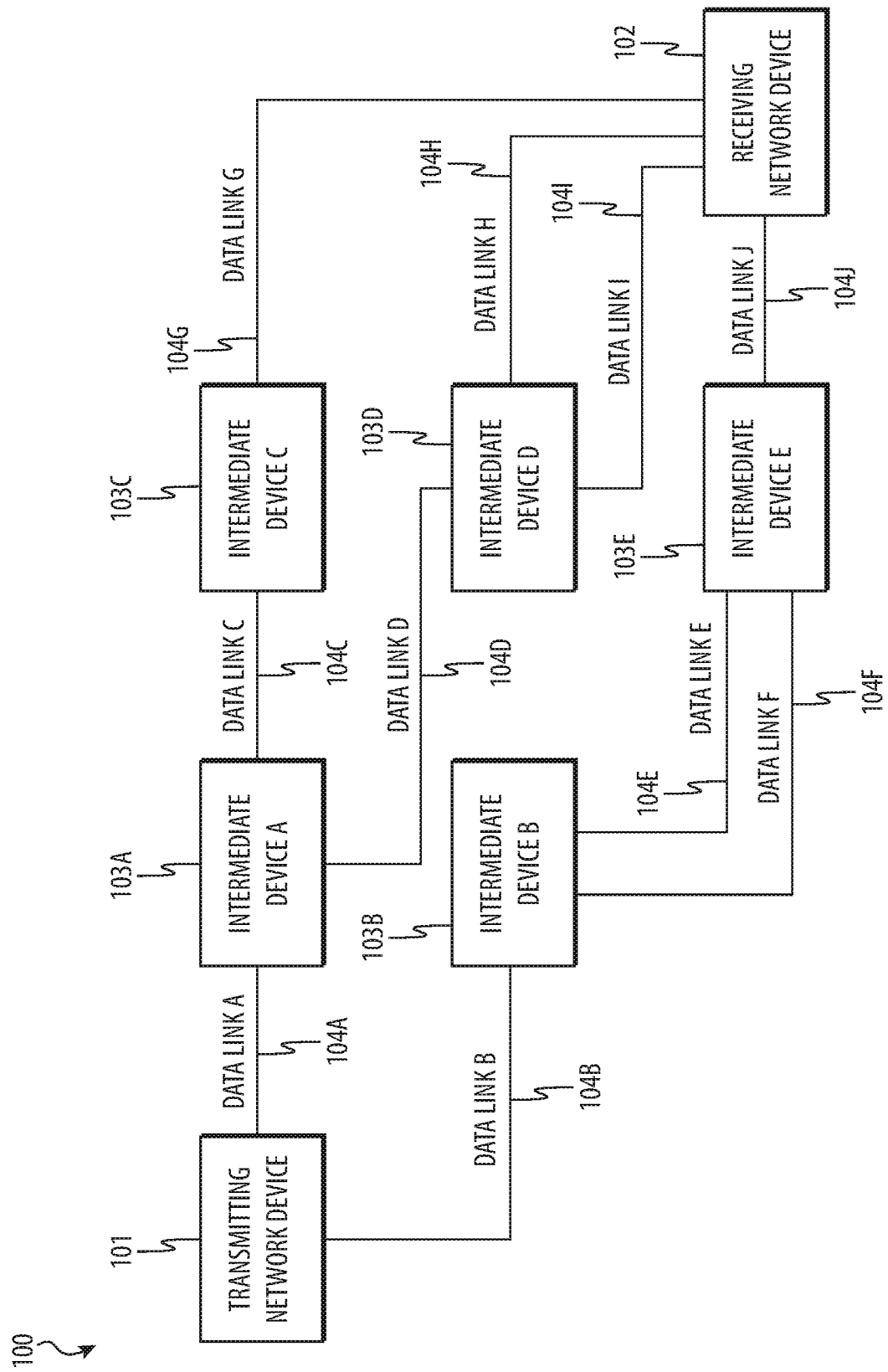
FIG. 1 depicts an example system for data link error feedback signaling.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Network devices may transmit data via one or more data links (such as fiber optic data links, wireless data links, and so on) and/or other network devices. For example, a transmitting network device or "head" may determine to transmit a network data unit (a formatted unit of data carried by a network, typically including control information and a payload and/or user data, such as an internet protocol and/or other packet, an Ethernet frame, and so on) to a receiving network device or "tail", consult a routing table or other mechanism regarding a data link to use for the transmission, and transmit the network data unit via the data link. The data link may connect the transmitting network device and the receiving network device, and/or the data link may connect the transmitting network device and an intermediate network device. In the latter situation, the intermediate network device may forward the network data unit to the receiving network device via one or more other data links and/or other intermediate network devices.

Modern network routing includes no mechanism to signal that a router or endpoint network electronic device received errors along a transmission path of data. For example, a dirty fiber optic cable and/or other data link issue may cause a data link to be flawed, resulting in a degraded transmission signal that may introduce errors into a network data unit. A head network electronic device may determine a transmission path for a network data unit sent from the head to a tail network electronic device and the tail may detect if errors occur as it may perform one or more error checks on the received network data unit, but the tail has no mechanism to communicate this to the head so that the head may adjust for a path with errors.

To ameliorate this issue, a receiving network device in a data link error feedback signaling system may determine that an error occurred in a network data unit received over a data link from a transmitting network device (such as by using a cyclic redundancy check or "CRC', a checksum, and so on) and provide data link integrity information to the transmitting network device, informing the transmitting network device of the received error. For example, the transmitting network device may provide the data link integrity information by marking the data link flawed in a routing protocol such as OSPF ("open shortest path first"), BGP ("border gateway protocol"), BFD ("bidirectional forwarding detection"), and so on. By way of another example, the transmitting network device may provide the data link integrity information by providing information in an informational protocol such as LLDP ("link layer discovery protocol") and so on. The receiving network device may provide the data link integrity information for each errored network data unit detected, periodically provide aggregated data on received errors, and so on.

The transmitting network device may receive the data link integrity information and determine whether or not to pursue an action. Such an action may include marking the data link less preferred, marking the data link down, transmitting an alarm for a network operator to take an action on the data link, doing nothing because a threshold for a level of unacceptable errors has not yet been reached, and so on.

As such, this application may extend existing internet protocol and/or other protocol routing to provide feedback to a transmitting network device that a data link being used is resulting in errored network data units. In this way, the data link error feedback signaling system may be able to perform additional routing and/or transmission error amelioration functions that the data link error feedback signaling system would not previously have been able to perform absent the technology disclosed herein. This may enable the data link error feedback signaling system to operate more efficiently while consuming fewer hardware and/or software resources as more resource consuming techniques could be omitted. Further, these techniques may otherwise improve operation of the data link error feedback signaling system by reducing transmission errors, improving data transmission speed, reducing unnecessary network traffic, enabling adjustment of network transmission to network conditions, and so on.

The following disclosure relates to data link error feedback signaling. A data link error feedback signaling system includes a transmitting network device and a receiving network device. The receiving network device may be operable to receive a network data unit from the transmitting network device over a data link, detect an error in the network data unit, and provide data link integrity information based on the error to the transmitting network device. The receiving network device may provide the data link integrity information by marking the data link flawed in a routing protocol, transmitting the data link integrity information via an informational protocol, and so on. The transmitting network device may respond to the data link integrity information, such as by marking the data link less preferred, marking the data link down, transmitting an alarm regarding the data link to a network operator, omitting taking an action upon determining that errors are below an error threshold, and so on.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 depicts an example system 100 for data link error feedback signaling. The system 100 may include one or more network devices, such as one or more transmitting network devices 101, receiving network devices 102, and/or intermediate network devices A-E 103A-103E. The network devices may be any kind of network devices, such as smart phones, laptop computing devices, desktop computing devices, server computing devices, digital media players, smart doorbells, smart thermostats, routers, hubs, switches, wearable devices, mobile computing devices, tablet computing devices, smart kitchen appliances, smart laundry machines, and so on. The network devices may be operable to communicate via one or more data links A-J 104A-104J using one or more different communication protocols, such as the internet protocol, Ethernet protocol, and so on. The data links A-J 104A-104J may be any kind of data link, such as fiber optic data links, wireless data links, and so on.

The receiving network device 102 may be operable to receive a network data unit (a formatted unit of data carried by a network, typically including control information and a payload and/or user data, such as an internet protocol and/or other packet, an Ethernet frame, and so on) from the transmitting network device 101 over one or more of the data links A-J 104A-104J and/or one or more of the intermediate network devices A-E 103A-103E, detect one or more errors in the network data unit, and provide data link integrity information based on the error(s) to the transmitting network device 101. The transmitting network device 101 may respond to the data link integrity information.

For example, the transmitting network device 101 may determine to transmit a network data unit to the receiving network device 102; consult a routing table or other mechanism regarding one or more of the data links A-J 104A-104J and/or one or more of the intermediate network devices A-E 103A-103E to use for the transmission, determine to transmit the network data unit via a data link transmission path including the data link A 104A, intermediate network device A 103A, data link C 104C, intermediate network device C 103C, and data link G 104G; and transmit the network data unit accordingly. However, the receiving network device 102 may detect one or more errors in the network data unit, determine that the data link transmission path is flawed, and provide data link integrity information accordingly to the transmitting network device 101. The transmitting network device 101 may respond in various ways, such as by instead using a data link transmission path including the data link B 104B, the intermediate network device B 103B, data link E 104E, intermediate network device E 103E, and data link J 104J.

Although a particular configuration of network devices and data links A-J 104A-104J is illustrated and described, it is understood that this is an example. By way of illustration, the transmitting network device 101 is illustrated and described as a transmitting device because the transmitting network device 101 transmits the network data unit in this example; the receiving network device 102 is illustrated and described as a receiving device because the receiving network device 102 receives the network data unit in this example; and the intermediate network devices A-E 103A-103E are illustrated and described as intermediate devices because the intermediate network devices A-E 103A-103E pass the network data unit between the transmitting network device 101 and the receiving network device 102 in this example. However, it is understood that this is an example. In any number of examples, any of these network devices may transmit one or more network data units (in which situation such a network device may be a transmitting device), receive one or more network data units (in which situation such a network device may be a receiving device), pass one or more network data units between a transmitting device and a receiving device (in which situation such a device may be an intermediate device and/or a receiving device), and so on. Further, multiple network devices may act as receiving devices as multiple network devices may receive a network data unit and each may detect one or more errors and/or provide data link integrity information to one or more network devices involved in transmitting such network data units. Additionally, as multiple network data units may receive data link integrity information, a transmitting device may receive data link integrity information from multiple receiving devices. By way of another illustration, the example above illustrates and describes transmitting the network data unit via multiple data links A-J 104A-104J. However, it is understood that this is an example. In some examples, a network data unit may be transmitted over a single one of the data links A-J 104A-104J. Various configurations are possible and contemplated without departing from the scope of the present disclosure.

The receiving network device 102 may detect one or more errors in the network data unit in a variety of different ways. Examples of such error detection include CRC, a checksum, and so on. The receiving network device 102 may determine that a data link over which the network data unit is received is flawed when such an error is detected, particularly when a network device that forwarded and/or otherwise transmitted the network data unit to the receiving network device 102 via the data link had not previously detected such an error. Various configurations are possible and contemplated without departing from the scope of the present disclosure.

The receiving network device 102 may provide the data link integrity information in a variety of ways. For example, the receiving network device 102 may provide the data link integrity information by marking the one or more of the data links A-J 104A-104J flawed in a routing protocol. Such routing protocols may include OSPF, BGP, BFD, and so on. Marking the one or more of the data links A-J 104A-104J flawed in a routing protocol may result in such markings being communicated to and/or otherwise discovered by the transmitting network device 101, which may accordingly update a routing table and/or other mechanism, and/or perform one or more other actions. In other examples, the receiving network device 102 may provide the data link integrity information by transmitting the data link integrity information via an informational protocol. Such an informational protocol may include LLDP and/or another informational protocol. Transmitting the data link integrity information via an informational protocol may result in such data link integrity information being communicated to and/or otherwise discovered by the transmitting network device 101, which may accordingly update a routing table and/or other mechanism, and/or perform one or more other actions. In still other examples, the receiving network device 102 may provide the data link integrity information by using other mechanisms. Various configurations are possible and contemplated without departing from the scope of the present disclosure.

In some implementations, receiving network device 102 may provide the data link integrity information each time that an error is detected in a network data unit. In other implementations, the receiving network device 102 may provide the data link integrity information for an aggregate of data corresponding to multiple network data unit errors. For example, the receiving network device 102 may transmit the data link integrity information for the aggregate of data periodically (such as once per minute, hour, and so on), upon occurrence of a condition (such as when errors exceed an error threshold, such as when errors exceed 20, when errors occur in more than 50% of network data units received, and so on), and so on. Providing the data link integrity information less regularly may cause the transmitting network device 101 to correct issues related to flawed transmission paths more slowly, but may be less burdensome on network traffic due to the less frequent data link integrity communications. Various configurations are possible and contemplated without departing from the scope of the present disclosure.

The transmitting network device 101 may respond to the data link integrity information in a variety of different ways. For example, the transmitting network device 101 may respond to the data link integrity information by marking the one or more of the data links A-J 104A-104J less preferred. This may enable the transmitting network device 101 to be more likely to select unflawed data transmission paths, but still have flawed data transmission paths available in case unflawed data transmission paths are unavailable, overburdened, and so on. By way of another example, the transmitting network device 101 may respond to the data link integrity information by marking the one or more of the data links A-J 104A-104J down. This may enable the transmitting network device 101 to prevent use of flawed transmission paths. In various examples, the transmitting network device 101 may mark the one or more data links A-J 104A-104J down instead of less preferred based on the severity of the errors, the availability of other transmission paths, and so on. In still another example, the transmitting network device 101 may respond to the data link integrity information by transmitting an alarm regarding the one or more of the data links A-J 104A-104J to a network operator. This may enable the transmitting network device 101 to have flawed transmission paths corrected. In yet another example, the transmitting network device 101 may respond to the data link integrity information by omitting taking an action upon determining that errors are below an error threshold. This may enable the transmitting network device 101 to avoid taking actions when the burden of taking the action would exceed the benefit, such as where errors are few, infrequent, and so on. In still other examples, the transmitting network device 101 may respond to the data link integrity information by performing various automatic configuration actions and/or other actions. Various configurations are possible and contemplated without departing from the scope of the present disclosure.

Although the system 100 is illustrated and described as including particular components arranged in a particular configuration, it is understood that this is an example. In a number of implementations, various configurations of various components may be used without departing from the scope of the present disclosure.

For example, the system 100 is illustrated and described in the context of an internet protocol network. However, it is understood that this is an example. In various implementations, the system 100 may utilize any kind of network, networks, and/or communication protocol. Various configurations are possible and contemplated without departing from the scope of the present disclosure.

Figure 2:
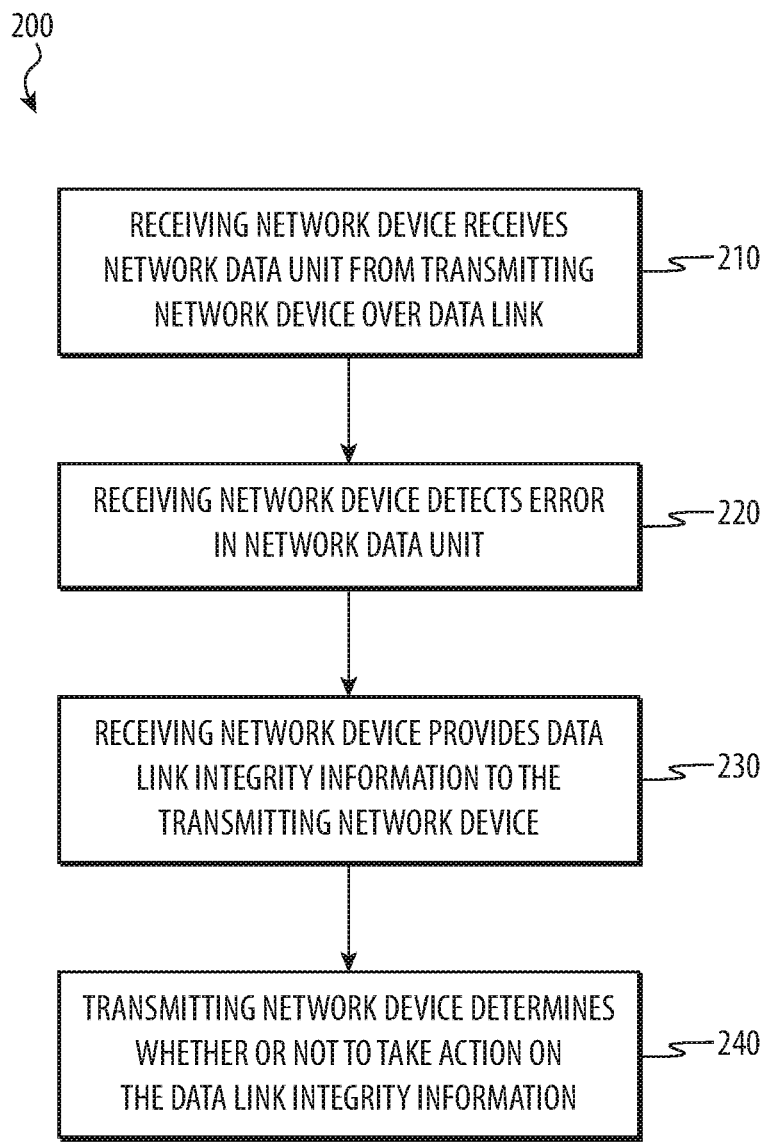
FIG. 2 depicts a flow chart illustrating a first example method for data link error feedback signaling. This method may be performed by the system of FIG. 1.

FIG. 2 depicts a flow chart illustrating a first example method 200 for data link error feedback signaling. This method 200 may be performed by the system 100 of FIG. 1.

At operation 210, a receiving network device (such as the receiving network device 102 and/or one or more of the intermediate network devices A-E 103A-103E of FIG. 1) may receive one or more network data units from one or more transmitting network devices (such as one or more of the transmitting network device 101 and/or one or more of the intermediate network devices A-E 103A-103E of FIG. 1) over one or more data links. The network data unit may be a formatted unit of data carried by a network, typically including control information and a payload and/or user data, such as an internet protocol and/or other packet, an Ethernet frame, and so on.

At operation 220, the receiving network device may detect an error in the network data unit. For example, the receiving network device may detect the error in the network data unit using CRC, a checksum, and so on. In some examples, the receiving network device 102 may determine that the data link is flawed based on the error.

At operation 230, the receiving network device may provide data link integrity information to the transmitting network device. For example, the transmitting network device may provide the data link integrity information by marking the data link flawed in a routing protocol such as OSPF, BGP, BFD, and so on. By way of another example, the transmitting network device may provide the data link integrity information by providing information in an informational protocol such as LLDP and so on. The receiving network device may provide the data link integrity information for each errored network data unit detected, periodically provide aggregated data on received errors, and so on.

At operation 240, the transmitting network device may determine whether or not to take action on the data link integrity information. The action may include marking the data link less preferred, marking the data link down, transmitting an alarm for a network operator to take an action on the data link, doing nothing because a threshold for a level of unacceptable errors has not yet been reached, and so on.

In various examples, this example method 200 may be implemented as a group of interrelated software modules or components that perform various functions discussed herein. These software modules or components may be executed within a cloud network and/or by one or more computing devices, such as the receiving network device 102, one or more of the intermediate network devices A-E 103A-103E, and/or the transmitting network device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the operation 240 is illustrated and described as the transmitting network device determining whether or not to take action on the data link integrity information. However, it is understood that this is an example. In some implementations, the transmitting network device may take an automatic configuration action in response to the data link integrity information without determining whether or not to take such an action. Various configurations are possible and contemplated without departing from the scope of the present disclosure.

In another example, the method 200 is illustrated and described as including both the operations performed by the receiving network device and the transmitting network device. However, it is understood that this is an example. In some implementations, a method for data link error feedback signaling may include either the operations performed by the receiving network device or the operations performed by the transmitting network device without including both. Various configurations are possible and contemplated without departing from the scope of the present disclosure.

Figure 3:
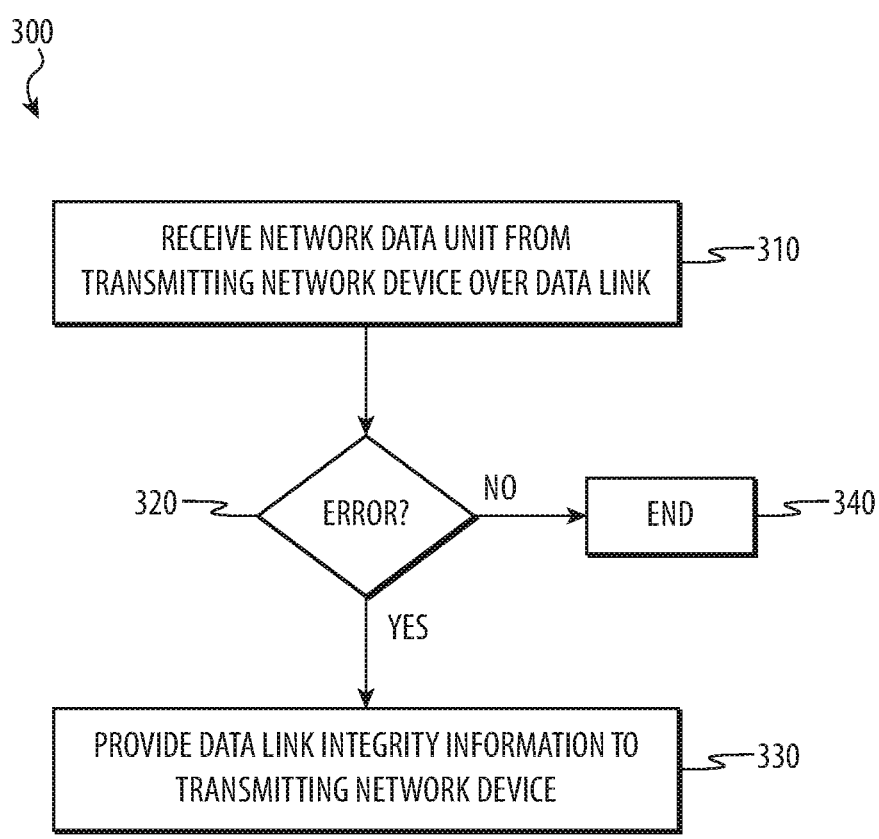
FIG. 3 depicts a flow chart illustrating a second example method for data link error feedback signaling. This method may be performed by the system of FIG. 1.

By way of illustration, FIG. 3 depicts a flow chart illustrating a second example method 300 for data link error feedback signaling. This method 300 may be performed by the system 100 of FIG. 1.

At operation 310, a network device (such as the receiving network device 102 and/or one or more of the intermediate network devices A-E 103A-103E of FIG. 1) may receive a network data unit from a transmitting network device (such as the transmitting network device 101 and/or one or more of the intermediate network devices A-E 103A-103E of FIG. 1) over a data link. At operation 320, the network device may determine whether or not there is an error in the network data unit (such as using CRC, a checksum, and so on). If not, the flow may proceed to operation 340 and end. Otherwise, the flow may proceed to operation 330.

At operation 330, after the network device determines that there is an error in the network data unit, the network device may provide data link integrity information. The network device may provide the data link integrity information to the transmitting network device, whether directly and/or indirectly.

In various examples, this example method 300 may be implemented as a group of interrelated software modules or components that perform various functions discussed herein. These software modules or components may be executed within a cloud network and/or by one or more computing devices, such as the receiving network device 102 and/or one or more of the intermediate network devices A-E 103A-103E of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as proceeding to operation 340 and ending when an error is not detected in the network data unit at operation 320. However, it is understood that this is an example. In some implementations, the flow may instead proceed to a determination of whether another network data unit is received. Various configurations are possible and contemplated without departing from the scope of the present disclosure.

Figure 4:
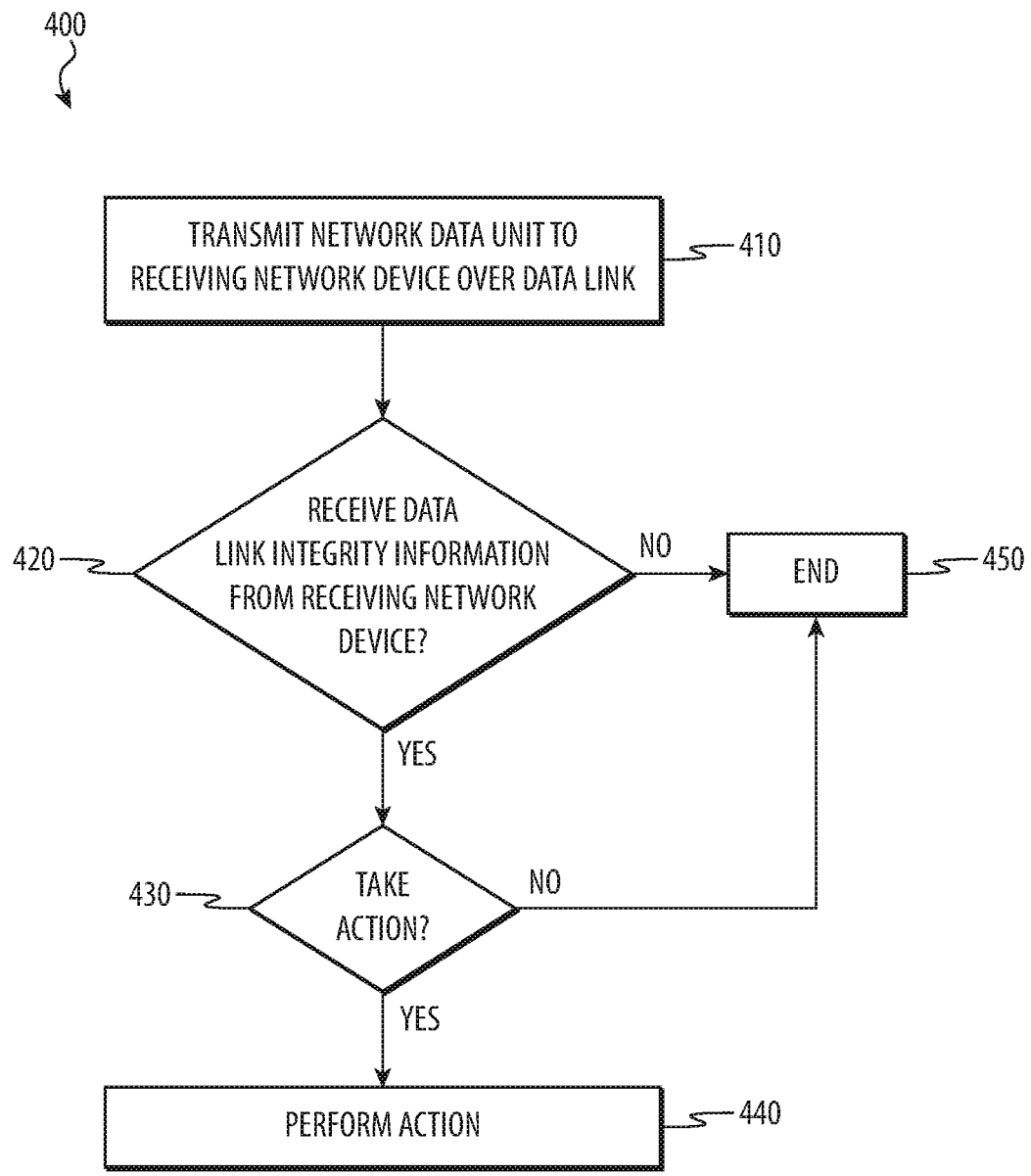
FIG. 4 depicts a flow chart illustrating a third example method for data link error feedback signaling. This method may be performed by the system of FIG. 1.

By way of another illustration, FIG. 4 depicts a flow chart illustrating a third example method 400 for data link error feedback signaling. This method 400 may be performed by the system 100 of FIG. 1.

At operation 410, a network device (such as the transmitting network device 101 and/or one or more of the intermediate network devices A-E 103A-103E of FIG. 1) may transmit a network data unit to a receiving network device (such as the receiving network device 102 and/or one or more of the intermediate network devices A-E 103A-103E of FIG. 1). The network device may transmit the network data unit to the receiving network device over a data link. At operation 420, the network device may determine whether or not data link integrity information is received from the receiving network device. Such data link integrity information may include information related to one or more detected network data unit errors, flawed data links, and so on. If not, the flow may proceed to operation 450 and end. Otherwise, the flow may proceed to operation 430.

At operation 430, after the network device determines that data link integrity information is received from the receiving network device, the network device may determine whether or not to take an action. The network device may determine whether or not to take the action in response to the data link integrity information, such as by evaluating whether or not errors related to the data link integrity information exceed an error threshold. If not, the flow may proceed to operation 450 and end. Otherwise, the flow may proceed to operation 440.

At operation 440, after the network device determines to take the action, the network device may perform the action. The action may include marking the data link less preferred, marking the data link down, transmitting an alarm regarding the data link to a network operator, omitting taking an action upon determining that errors are below an error threshold, and so on.

In various examples, this example method 400 may be implemented as a group of interrelated software modules or components that perform various functions discussed herein. These software modules or components may be executed within a cloud network and/or by one or more computing devices, such as the transmitting network device 101 and/or one or more of the intermediate network devices A-E 103A-103E of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the operation 430 is illustrated and described as the network device determining whether or not to take the action. However, it is understood that this is an example. In some implementations, the network device may take the action and omit the determination. Various configurations are possible and contemplated without departing from the scope of the present disclosure.

Figure 5:
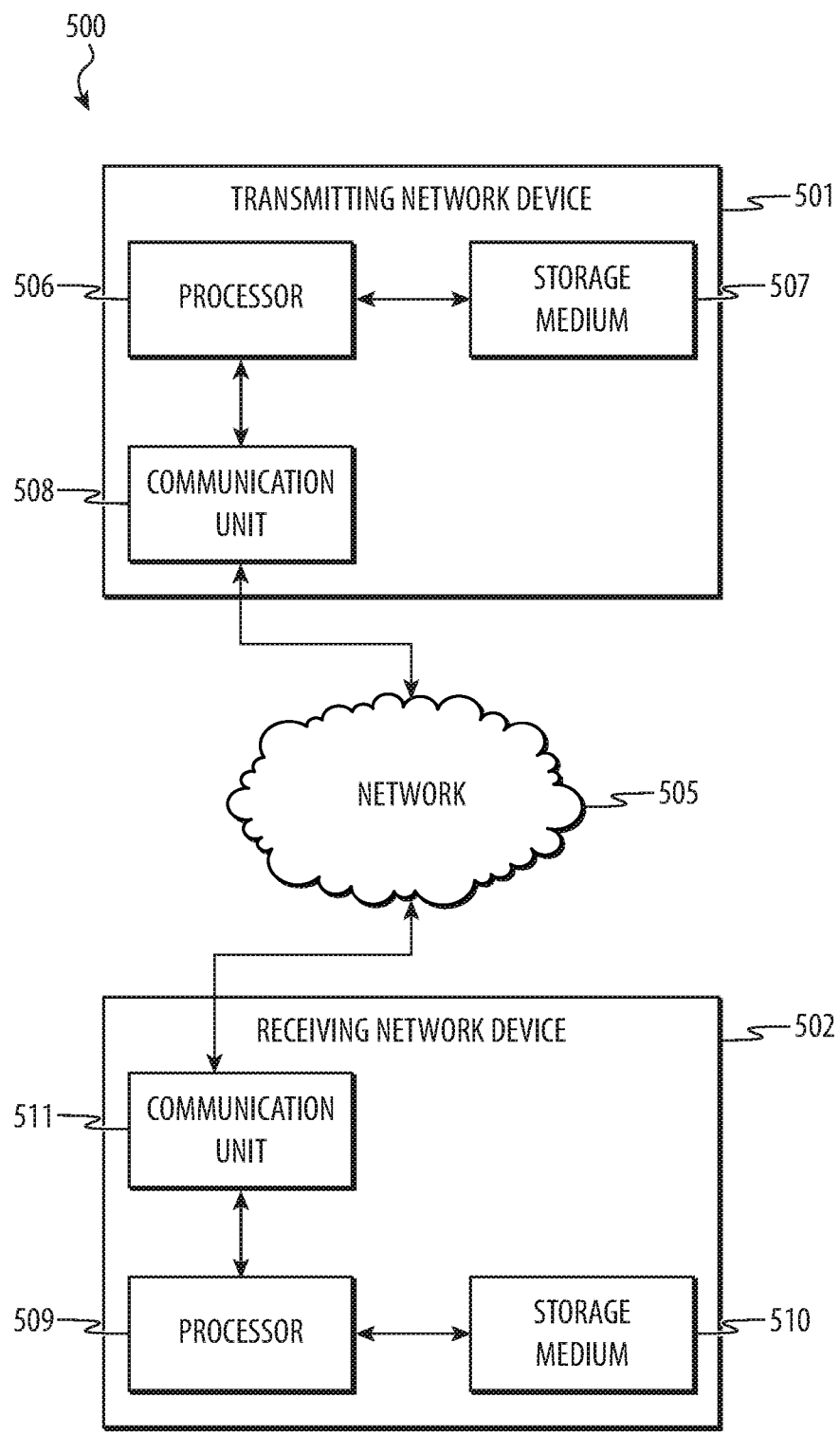
FIG. 5 depicts example relationships among example components that may be used to implement a data link error feedback signaling system. The data link error feedback signaling system may be the system of FIG. 1.

FIG. 5 depicts example relationships among example components that may be used to implement a data link error feedback signaling system 500. The data link error feedback signaling system 500 may be the system 100 of FIG. 1.

The data link error feedback signaling system 500 may include one or more transmitting network devices 501 that are operable to communicate with one or more receiving network devices 502 via one or more communication networks 505.

The transmitting network device 501 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, set top boxes, digital media players, and so on. The transmitting network device 501 may include one or more processors 506 and/or other processing units and/or controllers, one or more non-transitory storage media 507 (which may take the form of, but is not limited to, a magnetic storage medium; optical storage medium; magneto-optical storage medium; read only memory; random access memory; erasable programmable memory; flash memory; and so on), one or more communication units 508, and/or other components. The processor 506 may execute instructions stored in the non-transitory storage medium 507 to perform various functions. Such functions may include transmitting one or more network data units to the receiving network device 502 using the communication unit 508, receiving data link integrity information from the receiving network device 502 using the communication unit 508, taking one or more actions in response to the data link integrity information, determining whether or not to take one or more actions in response to the data link integrity information, and so on.

Similarly, the receiving network device 502 may be any kind of electronic device. The receiving network device 502 may also include one or more processors 509 and/or other processing units and/or controllers, one or more non-transitory storage media 510, one or more communication units 511, and/or other components. The processor 509 may execute instructions stored in the non-transitory storage medium 510 to perform various functions. Such functions may include receiving one or more network data units from the transmitting network device 501 using the communication unit 511, detecting one or more errors in the one or more network data units, determining one or more flaws in one or more data links based on the errors, providing data link integrity information to the transmitting network device 501 using the communication unit 511, and so on.

The communication network 505 may include one or more data links, intermediate network devices, and so on that may communicably connect the transmitting network device 501 and the receiving network device 502. The communication network 505 may be an internet protocol network, an Ethernet network, and/or any other kind of network.

Although FIG. 5 is illustrated and described as including particular components arranged in a particular configuration, it is understood that this is an example. In a number of implementations, various configurations of various components may be used without departing from the scope of the present disclosure.

For example, the transmitting network device 501 and the receiving network device 502 are illustrated as separate from, but communicably connected via, the communication network 505. However, it is understood that this is an example. In some implementations, the transmitting network device 501 and/or the receiving network device 502 may be routers, hubs, switches, and/or other components of the communication network 505. Various configurations are possible and contemplated without departing from the scope of the present disclosure.

In various implementations, a data link error feedback signaling system may include a transmitting network device and a receiving network device. The receiving network device may be operable to receive a network data unit from the transmitting network device over a data link, detect an error in the network data unit, and provide data link integrity information based on the error to the transmitting network device. The transmitting network device may respond to the data link integrity information.

In some examples, the receiving network device may provide the data link integrity information by at least one of marking the data link flawed in a routing protocol or transmitting the data link integrity information via an informational protocol. In a number of examples, the transmitting network device may respond to the data link integrity information by at least one of marking the data link less preferred, marking the data link down, transmitting an alarm regarding the data link to a network operator, or omitting taking an action upon determining that errors are below an error threshold. In various examples, the receiving network device may detect the error using at least one of a cyclic redundancy check or a checksum. In a number of examples, at least one of the receiving network device or the transmitting network device may be a router.

In some implementations, a receiving network device may include a communication unit, a non-transitory storage medium that stores instructions, and a processor. The processor may execute the instructions to receive a network data unit from a transmitting network device over a data link, detect an error in the network data unit, and provide data link integrity information based on the error to the transmitting network device.

In various examples, the processor may determine that the data link is flawed based on the error. In some examples, the processor may detect the error by performing a cyclic redundancy check on the network data unit. In a number of examples, the processor may detect the error by evaluating a checksum of the network data unit.

In some examples, the processor may provide the data link integrity information by marking the data link flawed in a routing protocol. In various such examples, the routing protocol may be at least one of an open shortest path first protocol, a border gateway protocol, or a bidirectional forwarding detection protocol.

In a number of examples, the processor may provide the data link integrity information via an informational protocol. In some such examples, the informational protocol may be a link layer discovery protocol.

In various examples, the processor may provide the data link integrity information as part of an aggregate of data corresponding to multiple network data unit errors.

In a number of implementations, a transmitting network device may include a communication unit, a non-transitory storage medium that stores instructions, and a processor. The processor may execute the instructions to transmit a network data unit to a receiving network device over a data link, receive data link integrity information from the receiving network device based on an error detected in the network data unit by the receiving network device, and respond to the data link integrity information.

In various examples, the processor may respond to the data link integrity information by taking an action. In some such examples, the action may include marking the data link less preferred. In a number of such examples, the action may include marking the data link down.

In some examples, the processor may respond to the data link integrity information by transmitting an alarm regarding the data link to a network operator. In various examples, the processor may respond to the data link integrity information by, when an error threshold is exceeded, performing an action and, when the error threshold is not exceeded, omit performing the action.

As described above and illustrated in the accompanying figures, the present disclosure relates to data link error feedback signaling. A data link error feedback signaling system includes a transmitting network device and a receiving network device. The receiving network device may be operable to receive a network data unit from the transmitting network device over a data link, detect an error in the network data unit, and provide data link integrity information based on the error to the transmitting network device. The receiving network device may provide the data link integrity information by marking the data link flawed in a routing protocol, transmitting the data link integrity information via an informational protocol, and so on. The transmitting network device may respond to the data link integrity information, such as by marking the data link less preferred, marking the data link down, transmitting an alarm regarding the data link to a network operator, omitting taking an action upon determining that errors are below an error threshold, and so on.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
    a first network device; and
    a second network device that provides data link integrity information based on at least one error in at least one network data unit received over a data link, the at least one network data unit transmitted by the first network device, the data link integrity information describing the at least one error; wherein the first network device determines whether to mark the data link less preferred, mark the data link down, or omit performing an action according to a severity of the at least one error.

2. The system of claim 1, wherein the first network device reevaluates the data link at a subsequent time.

3. The system of claim 2, wherein the first network device reevaluates the data link at the subsequent time according to additional data link integrity information provided by the second network device.

4. The system of claim 1, wherein the first network device receives the data link integrity information from the second network device.

5. The system of claim 1, wherein the data link directly connects the first network device and the second network device.

6. The system of claim 1, wherein the second network device evaluates the at least one network data unit to determine presence of the at least one error.

7. The system of claim 1, wherein the first network device compares the severity to at least one threshold.

8. The system of claim 1, wherein the data link integrity information specifies a severity threshold of the at least one error.

9. The system of claim 1, wherein at least one of the first network device or the second network device comprises a router.

10. A transmitting network device, comprising,
    a communication unit;
    a non-transitory storage medium that stores instructions; and
    a processor that executes the instructions to:
        receive data link integrity information generated by a receiving network device based on at least one error detected in at least one network data unit transmitted over a data link, the data link integrity information describing the at least one error; and
        determine whether to mark the data link less preferred, mark the data link down, or omit performing an action according to a severity of the at least one error.

11. The transmitting network device of claim 10, wherein the processor determines whether to mark the data link less preferred or down when it is determined that the at least one error is caused by the data link.

12. The transmitting network device of claim 10, wherein the processor determines to omit performing the action when it is determined that the at least one error is not caused by the data link.

13. The transmitting network device of claim 10, wherein the processor determines whether the at least one error is caused by the data link.

14. The transmitting network device of claim 10, wherein:
    the data link is a first data link; and
    the processor receives the data link integrity information via a second data link.

15. The transmitting network device of claim 10, wherein the processor is operable to mark the data link up after marking the data link down.

16. The system of claim 1, wherein the second network device provides the data link integrity information to the first network device via at least one other device.

17. The system of claim 1, wherein the severity of the at least one error is described in the data link integrity information.

18. The system of claim 1, wherein the severity of the at least one error corresponds to at least one of a cyclic redundancy check threshold or a checksum threshold.

19. The transmitting network device of claim 10, wherein the processor further determines whether to transmit an alert according to the severity of the at least one error.

20. The transmitting network device of claim 10, wherein the transmitting network device comprises a router.

* * * * *